United States Patent
Chaudhuri et al.

(10) Patent No.: US 10,430,825 B2
(45) Date of Patent: Oct. 1, 2019

(54) RECOMMENDING ADVERTISEMENTS USING RANKING FUNCTIONS

(71) Applicant: Adobe Inc., San Jose, CA (US)

(72) Inventors: Sougata Chaudhuri, Ann Arbor, MI (US); Georgios Theocharous, San Jose, CA (US); Mohammad Ghavamzadeh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 610 days.

(21) Appl. No.: 14/997,987

(22) Filed: Jan. 18, 2016

(65) Prior Publication Data

US 2017/0206549 A1 Jul. 20, 2017

(51) Int. Cl.
*G06Q 30/02* (2012.01)
*H04L 29/08* (2006.01)
*G06N 20/00* (2019.01)

(52) U.S. Cl.
CPC .......... *G06Q 30/0246* (2013.01); *G06N 20/00* (2019.01); *G06Q 30/0255* (2013.01); *G06Q 30/0277* (2013.01); *H04L 67/22* (2013.01)

(58) Field of Classification Search
CPC .................................................. G06Q 30/0241
USPC .......................................................... 705/14
See application file for complete search history.

(56) References Cited

U.S. PATENT DOCUMENTS

| | | | | |
|---|---|---|---|---|
| 2001/0004733 A1* | 6/2001 | Eldering | ................ | G06Q 20/20 705/14.41 |
| 2011/0191151 A1* | 8/2011 | Rosa | ...................... | G06Q 30/02 705/14.1 |
| 2012/0123876 A1* | 5/2012 | Sista | .................. | G06Q 30/0256 705/14.73 |
| 2013/0041750 A1* | 2/2013 | Ye | .......................... | G06Q 30/02 705/14.52 |

OTHER PUBLICATIONS

Agarwal,"Taming the Monster: A Fast and Simple Algorithm for Contextual Bandits", In Proceedings of the 31st International Conference on Machine Learning, 2014, 9 pages.
Agarwal,"Translating Relevance Scores to Probabilities for Contextual Advertising", In Proceedings of CIKM 2009, Available at <http://research.yahoo.com/files/score2prob.pdf>, Nov. 2009, 4 pages.
(Continued)

Primary Examiner — Matthew L Hamilton
(74) Attorney, Agent, or Firm — SBMC

(57) ABSTRACT

A digital medium environment is described to recommend advertisements using ranking functions. A ranking function is configured to compute a score by applying a user context vector associated with a user to individual ranking weight vectors associated with advertisements, and provide the advertisement with the highest score to the user. In order to learn the ranking weight vectors for the ranking function, training data is obtained that includes user interactions with advertisements during previous sessions as well as user context vectors. The ranking weight vectors for the ranking function associated with each advertisement can then be learned by controlling the score generated by the ranking (Continued)

function to be higher for positive interactions than the negative interactions. To do so, the ranking weight vectors may be learned by optimizing an area under the curve ranking loss (AUCL) for the ranking function.

20 Claims, 6 Drawing Sheets

(56) References Cited

OTHER PUBLICATIONS

Agrawal,"Thompson Sampling for Contextual Bandits with Linear Payoffs", In Proceedings of the 30th International Conference on Machine Learning, 2013, 9 pages.
Beygelzimer,"Multiclass Classification with Filter Trees", 2007, 11 pages.
Calders,"Efficient AUC Optimization for Classification", In Knowledge Discovery in Databases: PKDD, 2007, 12 pages.
Cao,"An Optimized Cost-Sensitive SVM for Imbalanced Data Learning", In Advances in Knowledge Discovery and Data Mining, 2013, 12 pages.
Chapelle,"An Empirical Evaluation of Thompson Sampling", in Advances in neural information processing, 2011, 9 pages.
Chawla,"Editorial: Special Issue on Learning from Imbalanced Data Sets", ACM Sigkdd Explorations Newsletter, 2004, 6 pages.
Cheng,"FSelector: a Ruby gem for feature selection", Bioinformatics, 2012, pp. 2851-2852.
Chu,"Contextual Bandits with Linear Payoff Functions", In International Conference on Artificial Intelligence and Statistics, 2011, 7 pages.
Cortes,"AUC Optimization vs. Error Rate Minimization", Advances in neural information processing systems, 2004, 8 pages.
Dudik,"Doubly Robust Policy Evaluation and Learning", In Proceedings of the 28th International Conference on Machine Learning, 2011, 8 pages.
Dudik,"Efficient Optimal Learning for Contextual Bandits", Proceedings of the 27th Conference on Uncertainty in Artificial Intelligence, 2011, 20 pages.
He,"Practical Lessons from Predicting Clicks on Ads at Facebook", In Proceedings of 20th ACM SIGKDD Conference on Knowledge Discovery and Data Mining,, 2014, 9 pages.
Koh,"An Empirical Evaluation of Ensemble Decision Trees to Improve Personalization on Advertisement", Adobe Systems, 2014, 4 pages.
Langford,"The Epoch-Greedy Algorithm for Contextual Multi-armed Bandits", In Advances in neural information processing systems, 2008, 8 pages.
Li,"An Unbiased Offline Evaluation of Contextual Bandit Algorithms with Generalized Linear Models", In Proceedings of the fourth ACM international conference on Web search and data mining, 2011, 18 pages.
McMahan,"Ad Click Prediction: a View from the Trenches", In Proceedings of the 19th ACM SIGKDD international conference on Knowledge discovery and data mining, 2013, 9 pages.
Richardson,"Predicting Clicks: Estimating the Click-Through Rate for New Ads", WWW 2007 / Track: Search—Session: Advertisements and Click Estimates, 2007, pp. 521-529.
Rifkin,"In Defense of One-Vs-All Classification", The Journal of Machine Learning Research, 2004, 41 pages.
Shamir,"Stochastic Gradient Descent for Non-smooth Optimization: Convergence Results and Optimal Averaging Schemes", In Proceedings of the 30th International Conference on Machine Learning, 2013, 9 pages.
Theocharous,"Ad Recommendation Systems for Life-Time Value Optimization", In Proceedings of the 24th International Conference on World Wide Web Companion, 2015, 6 pages.

* cited by examiner

400

402
Obtain training data that at least describes interactions by one or more users with the advertisements that occurred during previous sessions and user context vectors associated with each of the one or more users

404
Classify each interaction of the training data as a positive interaction corresponding to a user interacting with the advertisement or a negative interaction corresponding to the user not interacting with the advertisement

406
Learn ranking weight vectors for a ranking function associated with each advertisement by controlling the score of the ranking function to be higher for each of the positive interactions than the negative interactions

Fig. 4

RECOMMENDING ADVERTISEMENTS USING RANKING FUNCTIONS

Digital advertisement recommendation techniques are used in digital medium environments to recommend digital advertisements based on user interaction. For example, a service provider of a website may employ a model generated from training data that describes user interactions with particular advertisements. The model may describe the likelihood that users will interact with a particular advertisement, such as by clicking on the advertisement which may lead the user to purchase a good or service made available by the service provider. This model is then used to recommend advertisements to a subsequent user to increase a likelihood that the subsequent user will interact with the advertisement.

Many conventional advertisement recommendation models are trained using binary classifiers that attempt to map advertisements to users in order to maximize the user interaction with the advertisements (e.g., number of clicks). For each advertisement, a separate binary classifier is trained to predict whether a user will interact with the advertisement or not. Binary classifiers are trained by optimizing the accuracy of this prediction, such that the binary classifier should ideally learn to accurately predict if a user will interact with an advertisement or not.

The prediction is done by the classifier outputting a score for a user. If the score is positive, then the classifier predicts that the user will interact with the corresponding advertisement. The higher the score, the more confident the prediction will be. Similarly, if the score is negative, then the classifier predicts that the user will not interact with the advertisement. The lower the score, the more confident the prediction will be.

A classifier-based recommendation policy may be constructed by combining the trained classifiers, such that for a new user (whose context vector is known), each classifier corresponding to each advertisement predicts whether the user would interact with the advertisement. Among the classifiers which predict that the user will interact with their corresponding advertisement, the advertisement whose classifier is most confident (e.g., gives the highest score) is recommend to the user.

However, a major issue with conventional classifier-based recommendation systems is that, in practice, users rarely click on the recommended advertisements. For example, users may click on less than 1% of all recommended advertisements. This results in an extreme lack of positive examples for each binary classifier, often referred to as an extreme class imbalance problem. For each advertisement, when there are very few positive interactions (very few users interacting with the advertisement) and a high number of negative interactions (a large number of users not interacting with the advertisement), a high accuracy for the corresponding classifier is achieved by predicting that no users will interact with the advertisement. This can be explained by an example. If there is 1 positive example and 99 negative examples, then predicting all 100 examples to be negative examples gives an accuracy of 99%, which is an extremely high accuracy in binary classification terminology. Thus, conventional binary classifiers can obtain a high accuracy by predicting both positive and negative interactions as negative interactions, but will fail to identify the rare but very important positive interactions. As such, when the classifier-based recommendation policy is constructed from the classifiers, for a new user (whose context vector is known), every classifier corresponding to every advertisement would predict that the user will not interact with the advertisement. Accordingly, classifier-based recommendation systems are unsuitable for advertisement recommendation because they fail to accurately predict the rare but highly important positive interactions corresponding to users that will click on the advertisement in order to purchase a good or service.

SUMMARY

A digital medium environment is described to recommend advertisements using ranking functions. In order to increase a likelihood that the recommendation is accurate, a ranking function is used to compute a score that predicts the likelihood that a respective user will interact with the advertisement. The ranking function generates the score by applying a user context vector (e.g., demographic information or device information) associated with a user to individual ranking weight vectors associated with advertisements. The advertisement with the highest score is then selected and provided to the user as a recommendation.

In order to learn the weights for the ranking function, training data is obtained that includes user interactions with advertisements during previous sessions as well as user features. Then, each user interaction is classified as either a positive interaction corresponding to a user interacting with the advertisement or a negative interaction corresponding to the user not interacting with the advertisement. The ranking weight vectors for the ranking function associated with each advertisement can then be learned by controlling the score generated by the ranking function to be higher for the positive interactions than the negative interactions. To do so, the ranking weight vectors may be learned by optimizing an area under the curve ranking loss (AUCL) for the ranking function.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 illustrates a procedure in an example implementation of learning ranking weight vectors for ranking functions.

DETAILED DESCRIPTION

Overview

Figure 1:
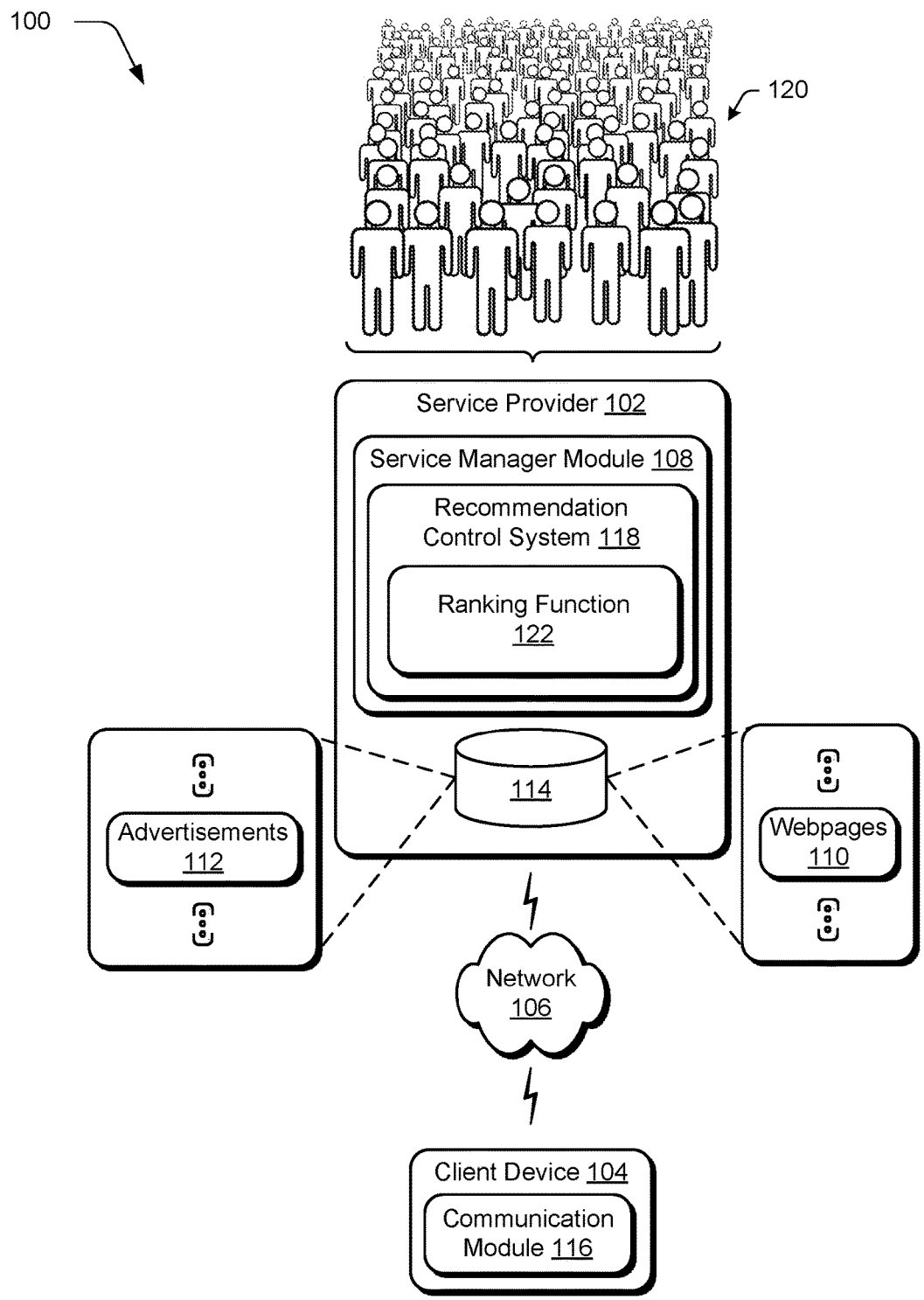
FIG. 1 illustrates an environment in an example implementation that is operable to employ techniques described herein.

Advertisement recommendations using ranking functions in a digital medium environment are used to increase the accuracy of advertisement recommendations, such as to increase the likelihood of a user interacting with an advertisement (e.g., by selecting or clicking on the advertisement to purchase a good or service from a service provider). To do so, an advertisement recommendation policy is constructed by training a ranking function for each advertisement, instead of a binary classifier for each advertisement. The ranking functions are learned by optimizing area under the curve loss (AUCL), which is a ranking measure, as opposed to classifiers which are learned by optimizing accuracy, which is a classification measure. Area under the curve (AUC) is a ranking measure, and AUCL is the loss version of AUC. The ranking functions (and the ranking losses) are not used to build advertisement recommendation policies, but rather they are used to solve ranking problems, like ranking items related to a search query.

In order to learn a ranking function per advertisement, training data is used, which is similar to the training data used by conventional classifier-based recommendation policies. For each advertisement, the training data consists of interactions (e.g., click or no click) between the advertisement and users (whose context vectors are known) that occurred during previous sessions. Thus, the training data for each advertisement will include a user context vector and an indication of whether or not the user clicked on the advertisement), for all users to whom the advertisement was shown in previous sessions.

Each ranking function, corresponding to each advertisement, learns a ranking weight vector by optimizing AUCL on the training data. The ranking function is configured to compute a score for a user by taking a dot product between the ranking weight vector and the user context vector. The AUCL function is optimized by controlling the score of the ranking function to be higher for each of the users who had a positive interaction with the advertisement, than the users who had a negative interaction with the corresponding advertisement. Thus, the ranking weight vectors are learned in such a way that the score induced by the weights on users who had positive interactions is higher than the scores induced by the weights on users who had negative interactions. Ranking is obtained by sorting the users in a descending order according to their scores. Thus, given a user who interacted with the advertisement and another user who did not interact with the advertisement, the ranking function would compute a higher score for the positive interaction user than the negative interaction user.

As an example, consider that the following user context vector is collected for each user: age, gender, and average monthly expenditure. The advertisement that is shown is that of an electronic gadget. It so happens, that in reality, the most important indicator that a user will click on the advertisement is the user's average monthly expenditure, followed by gender, with age being the least important indicator. In this case, the ranking weight vector will be learned in such a way that the most importance is given to the average monthly expenditure feature, with less importance given to gender, and the least importance given to age. Subsequently, given two new users, the ranking function will predict who is more likely to click on the advertisement by giving a higher score to one user than the other.

Optimizing AUCL to learn the ranking function (or more precisely the ranking weight vector) for each advertisement ensures that the ranking functions will score a positive interaction user higher than a negative interaction user. Notably, the ranking function does not predict whether a user will click on an ad or not, which is done by classifier-based recommendation systems. Instead, given two users, the ranking function predicts which user is more likely to click on the advertisement by giving one user a higher score than the other user. As such, optimizing AUCL bypasses the issue of class imbalance because the learned ranking function ranks positive interaction users before negative interaction users (by giving higher scores), rather than simply predicting whether the user is a positive or negative interaction user. Thus, if there is 1 positive interaction user and 99 negative interaction users, the ranking function will score the 1 positive interaction user higher than 99 negative interaction users.

After a ranking function is learned for each advertisement, the ranking functions are combined into a recommendation policy. The recommendation policy includes a threshold score that normalizes the scores of each of the ranking functions. In order to understand the reasons for normalizing the ranking functions, recall that the ranking function does not predict whether a user is a positive or negative interaction user. Thus, consider that a new user is given a first score by a first ranking function associated with a first advertisement, and a second score by a second ranking function associated with a second advertisement. In this example, the first ranking function may be configured such that it gives a higher score for all users (e.g., both users that positively interact with the advertisement as well as users who negatively interact with the advertisement), than the second ranking function associated with the second advertisement. Thus, without a threshold score to normalize the scores between ranking functions, the first advertisement will always be displayed to a user (even if the user might positively interact with the second advertisement) because the score generated by the first ranking function will always be higher than the score generated by the second ranking function. In order to negate this inherent scoring bias that may exist, a threshold score is learned for each ranking function during the training by optimizing for a measure such as precision, recall, or F-score.

Subsequently, when a new user interacts with the recommendation system, the ranking function for each advertisement will compute a score for the user as the dot product of the learned ranking weight vector and the user context vector. Then, for each score, the corresponding threshold score is subtracted to generate a "normalized score". The advertisement with the highest normalized score is then selected and provided to the user. In this way, the ranking functionality may be used to control which advertisements are provided to users in a manner that increases a likelihood of a user interacting with the advertisements, and thus is beneficial to the users as well as advertisers that provide the advertisements.

Example Environment

FIG. 1 is an illustration of an environment 100 in an example implementation that is operable to employ techniques described herein. The illustrated environment 100 includes a service provider 102 and a client device 104 that are communicatively coupled, one to another, via a network 106, which may be configured in a variety of ways.

The service provider 102 and client device 104 may be implemented by one or more computing devices. A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider 102 is illustrated as including a service manager module 108 that is representative of functionality to control user interaction with digital content. Examples of digital content are illustrated as webpages 110 and advertisements 112 that are stored in storage 114 and made available to the client device 104 via the network 106, such as through a communication module 116 including a browser, network-enabled application, and so forth. The service manager module 108, for instance, may determine which webpages 110 and/or advertisements 112 to provide to the client device 104 to increase a likelihood that the user will find this digital content of interest. This interest may then result in a corresponding increase in likelihood that the user will select the digital content, result in a conversion such that the user purchases a good or service, and so on.

As part of this control, the service manager module 108 includes a recommendation control system 118 that is representative of functionality to recommend items of digital content for interaction with particular users 120, e.g., particular ones of the advertisements 112 when included in a webpage 110. In this way, the service manager module 108 may determine which of the plurality of items of digital content will most likely result in a conversion for a particular user and provide those items.

In order to generate accurate recommendations of advertisements 112 for a user, the recommendation control system 118 is configured to use a ranking function 122 that computes a score based on a user context vector (e.g., demographic information, geographic location, or frequency of web page visits) and a ranking weight vector that is learned for each advertisement 112. The recommendation techniques involve generation (and ongoing updates) of the ranking weight vector of ranking function 122 that is formed based on user-advertisement interaction data, and providing recommendations using the ranking function 122.

Figure 2:
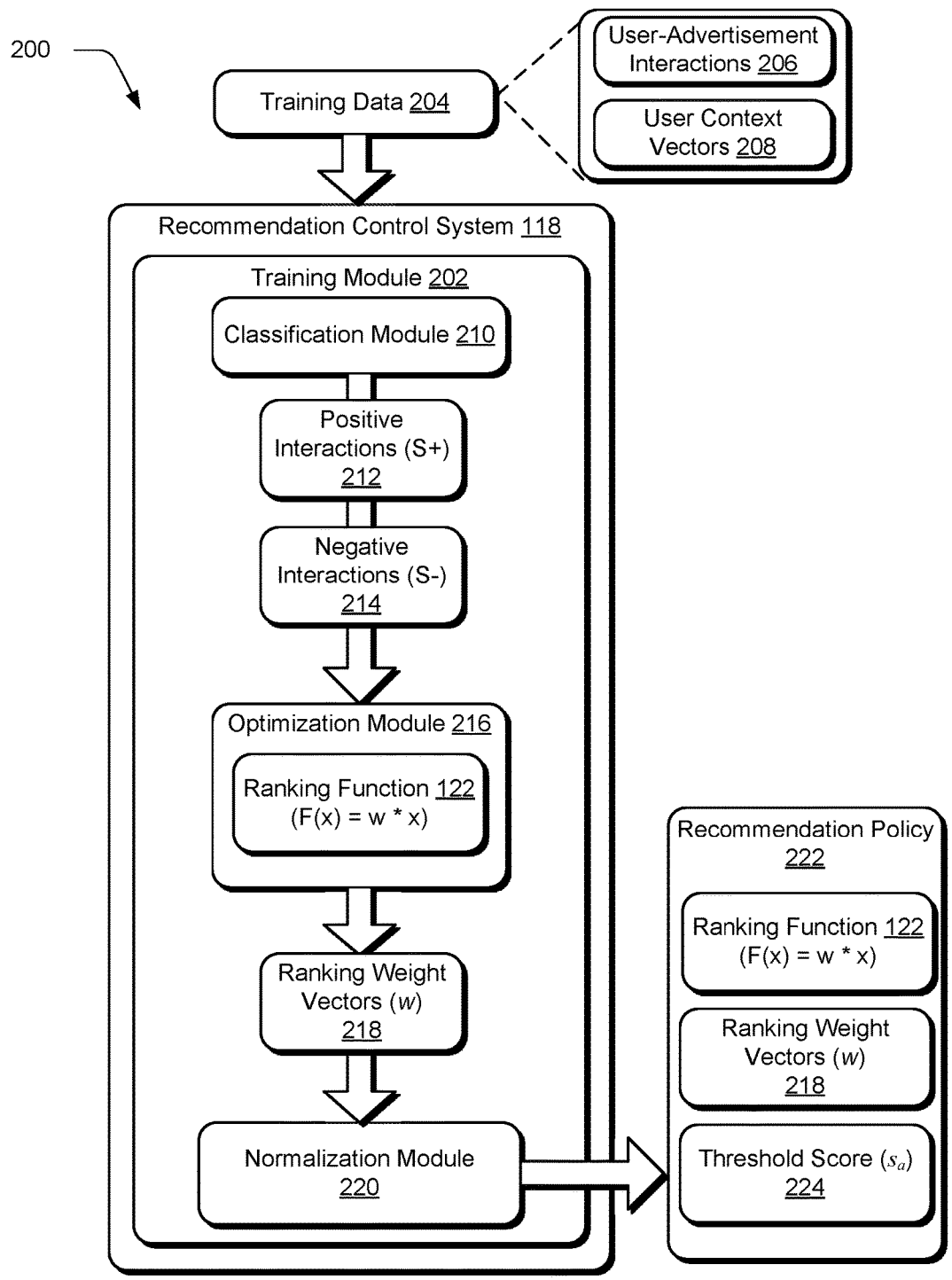
FIG. 2 illustrates a system in an example implementation in which a training module of the recommendation control system learns ranking weight vectors of the ranking function of FIG. 1.

FIG. 2 illustrates a system 200 in an example implementation in which a training module of the recommendation control system learns ranking weight vectors of the ranking function 122 of FIG. 1.

In system 200, a training module 202 receives training data 204, which is illustrated as including user-advertisement interactions 206 corresponding to previous user interactions with advertisements 112, as well as user context vectors 208 corresponding to relevant information that is known about the users, such as demographic information, geographic location, frequency of visits to a web page, and so forth.

Training module 202 includes a classification module 210 that classifies each user-advertisement interaction 206 as either a positive interaction 212 or a negative interaction 214. As described herein, positive interactions 212 correspond to user-advertisement interactions 206 in which the user interacted with advertisement 112 (e.g., by clicking on advertisement 112), and negative interactions 214 correspond to user-advertisement interactions 206 in which the user did not interact with advertisement 112 (e.g., by not clicking on advertisement 112). For example, for a given advertisement 112, the training data 204 may include data corresponding to an advertisement that was shown to users 1,000 times, and training module 202 may classify the data as including 5 positive interactions 212 (when the user selected or clicked on the advertisement) and 995 negative interactions 214 (where the user did not select or click on the advertisement).

Training module 202 includes an optimization module 216 that is configured to use the positive interactions 212 and negative interactions 214 of training data 204 to optimize ranking function 122 for each advertisement 112. As described herein, ranking function 122 is a linear scoring function parameterized by $f_w(x) = w \cdot x$, where w corresponds to ranking weight vectors 218 that are learned for each advertisement 112 and x corresponds to the user context vectors 208 of the training data 204. Ranking function 122 is configured to generate a ranking score based on a dot product of the ranking weight vectors 218 learned for each advertisement and the user context vectors 208 associated with a respective user.

Accordingly, as the user context vectors 208 are known, the optimization module 216 is configured to learn the ranking weight vectors 218 of the ranking function 122 for each advertisement 112. In order to learn ranking weight vectors 218, optimization module 216 controls the score of ranking function 122 to be higher for each of the positive interactions 212 than the negative interactions 214.

The optimization module 216 utilizes an area under the curve ranking loss (AUCL) function that is configured to generate a ranking measure. An AUCL function can be optimized by minimizing the ranking measure. In this example, the AUCL function is configured such that the ranking measure will be optimized by scoring all of the positive interactions 212 higher than the negative interactions 214. This issue is missed when optimizing an accuracy measure in classification, where a high value of accuracy measure can be obtained by predicting both positive and negative instances as negative instances, thereby failing to recognize the rare but important positive instances. Thus, when the weights 218 for the ranking function 122 are learned by optimizing the AUCL function, the optimization module 216 is rewarded for predicting the rare positive interactions 212, since doing so results in optimization of the ranking measure of the AUCL function. Optimization module 216 may utilize the following AUCL function:

$$AUCL = \frac{1}{|S^+||S^-|} \sum_{x^+ \in S^+} \sum_{x^- \in S^-} \underbrace{1(f_w(x^+) - f_w(x^-) < 0)}_{t}.$$

In the AUCL function above, S+ and S− correspond to the positive interactions 212 and negative interactions 214, respectively, while the value "t" corresponds to the difference between the scores, computed by the ranking function 122, of positive interactions 212 and negative interactions 214.

In order to make this AUCL function computationally tractable, the indicator functions can be replaced by a continuous, convex surrogate l(t), to provide the following function:

$$L(w) = \frac{1}{|S^+||S^-|} \sum_{x^+ \in S^+} \sum_{x^- \in S^-} \frac{\ell(wx^+ - wx^-)}{t}.$$

In order to optimize this function, optimization module 216 attempts to minimize "t", which corresponds to the difference between the score of positive interactions 212 and negative interactions 214, as determined by the ranking function 122. In one or more implementations, optimization module 216 uses a stochastic gradient descent (SGD) procedure. At every step of SGD, optimization module 216 randomly selects a positive interaction 212 and a negative interaction 214 from training data 204, followed by a gradient descent step. This makes the training procedure memory-efficient and enables training module 202 to train multiple ranking functions 122 for different advertisements 112 in parallel. By optimizing the objective function for each ranking function 122, optimization module 216 learns the ranking weight vectors 218 for each advertisement 112.

The learned ranking weight vectors 218 are then passed to a normalization module 220 which is configured to generate a recommendation policy 222 in which the ranking weight vectors 218 are normalized. To convert K separate weights 218 into recommendation policy 222, normalization module 220 learns a threshold score ($s_a$) 224 for each ranking weight vectors 218 separately, and then forms recommendation policy 222 using the following equation:

$$\pi(x) = \underset{a \in [K]}{\operatorname{argmax}} (f_{w_a}(x) - s_a).$$

In this equation, $\pi$ maps user context vectors 208 of a user x to an advertisement a with a maximum "normalized score", where the normalized score corresponds to shifting the score generated using ranking function 122 by the threshold score 224. This shifting negates the inherent scoring bias that may exist for each ranking function 122. That is, a ranking function 122 for a first advertisement a $\in$ [K] may learn to score all interactions (both positive interactions 212 and negative interactions 214) higher than a ranking function 122 for a second advertisement b $\in$ [K]. Therefore, for a user x, the ranking function 122 for the first advertisement a will always give a higher score than the ranking function 122 for the second advertisement b. Notably, this may lead to incorrect advertisement recommendations. Thus, the threshold score 224 ensures that the recommendation model 222 will recommend the correct advertisement 112 to a user by normalizing the learned ranking weight vectors 218 for each of the K different advertisements 112.

Having discussed a system in which ranking weight vectors 218 and threshold score 224 of a recommendation policy 222 can be learned, consider now a system in which the recommendation policy is used to recommend advertisements 112 to users in an online setting.

Figure 3:
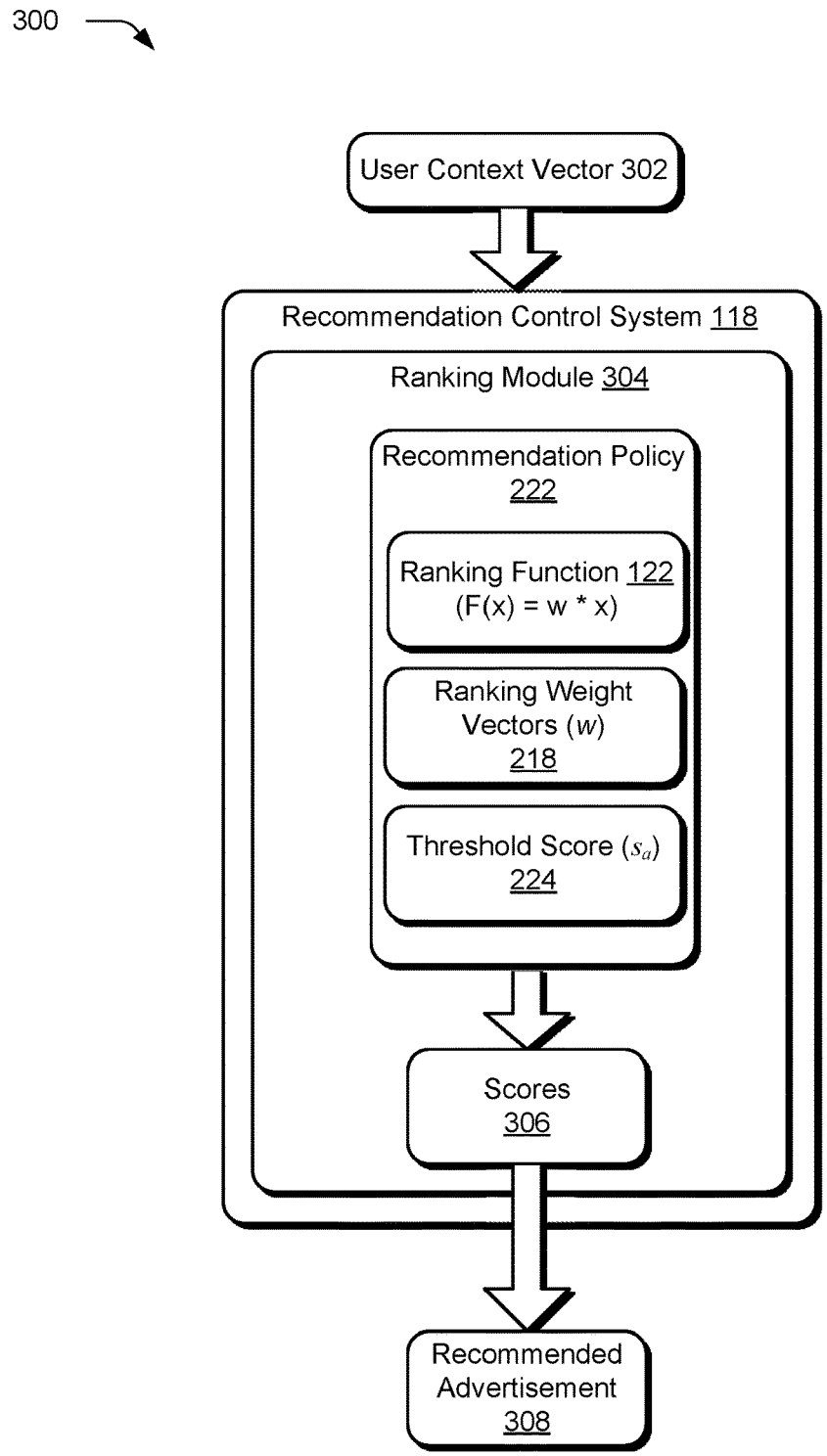
FIG. 3 illustrates a system 300 in an example implementation in which the recommendation policy of FIG. 2 is used to recommend an advertisement for a user in an online setting.

FIG. 3 illustrates a system 300 in an example implementation in which the recommendation policy of FIG. 2 is used to recommend an advertisement for a user in an online setting. In system 300, recommendation control system 118 obtains user context vectors 302 associated with a user, such as when a user navigates to a web page. As described throughout, user context vectors 302 of the user corresponds to relevant information that is known about the user, such as demographics, geographic location, frequency of visits, and so forth. For example, the user context vectors 302 may be obtained from an analytics provider.

Then, a ranking module 304 uses the recommendation policy 222 to apply ranking functions 122, associated with K different advertisements, to the user context vectors 302 in order to generate a score 306 for each of the K different advertisements. First, a score is calculated as the dot product of respective ranking weight vectors 218, learned by training module 202, and the user context vectors 302. A dot product is computed between the ranking weight vectors 218 and the user context vectors 302 by taking two equal length sequences of numbers and returning a single number, which can be defined either algebraically or geometrically. Algebraically, it is the sum of the products of the corresponding entries of the two sequences of numbers, and geometrically it is the produce of the Euclidean magnitudes of the two vectors and the cosine of the angle between them. Then, normalized scores 306 are computed for each advertisement by shifting each calculated score using the threshold score 224.

Recommendation control system 118 then selects a recommended advertisement 308 corresponding to the advertisement with the highest normalized score 306, and provides recommended advertisement 308 to the user, such as by causing recommended advertisement 308 to be displayed on a web page that the user has navigated to using a web browser.

In one or more implementations, the recommendation control system 118 is configured to monitor for user feedback corresponding to the recommended advertisement 308. For example, user feedback may correspond to positive interactions (where the user clicks on recommended advertisement 308) and negative interactions (where the user does not click on the recommended advertisement). Recommendation control system 118 may then provide the user feedback to training module 202 to enable training module 202 to update the ranking weight vectors 218 associated with each ranking function 122. In some cases, training module 202 may be implemented to update the ranking weight vectors 218 online and in real time. Alternately, training module 202 may be implemented to batch the user feedback, such that an update to the ranking weight vectors 218 occurs at predetermined time intervals, such as every 12 or 24 hours.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

FIG. 4 illustrates a procedure 400 in an example implementation of learning ranking weight vectors for ranking functions. At 402, training data is obtained that at least describes interactions by one or more users with advertisements that occurred during previous sessions and user context vectors associated with each of the one or more users. For example, training module 202 obtains training data 204 that includes user-advertisement interactions 206 by one or more users with advertisements 112 that occurred during previous sessions and user context vectors 208 associated with each of the one or more users.

At 404, each interaction of the training data is classified as a positive interaction corresponding to a user interacting with the advertisement or a negative interaction corresponding to the user not interacting with the advertisement. For example, classification module 210 classifies each interaction of the training data 204 as a positive interaction 212 corresponding to a user interacting with the advertisement 112 or a negative interaction 214 corresponding to the user not interacting with the advertisement 112.

At 406, ranking weight vectors are learned for a ranking function associated with each advertisement by controlling the score of the ranking function to be higher for each of the positive interactions than the negative interactions. For example, training module 202 learns ranking weight vectors 218 for a ranking function 122 associated with each advertisement 112 by controlling the score of the ranking function 122 to be higher for each of the positive interactions 212 than the negative interactions 214. The ranking function 122 is configured to generate a score predicting the likelihood that a respective user will interact with the advertisement 112, where the score is based on the learned weights 218 and the user context vector 208 of the respective user. The ranking weight vectors 218 are learned by optimizing an area under the curve ranking loss (AUCL) for the ranking function 122.

Figure 5:
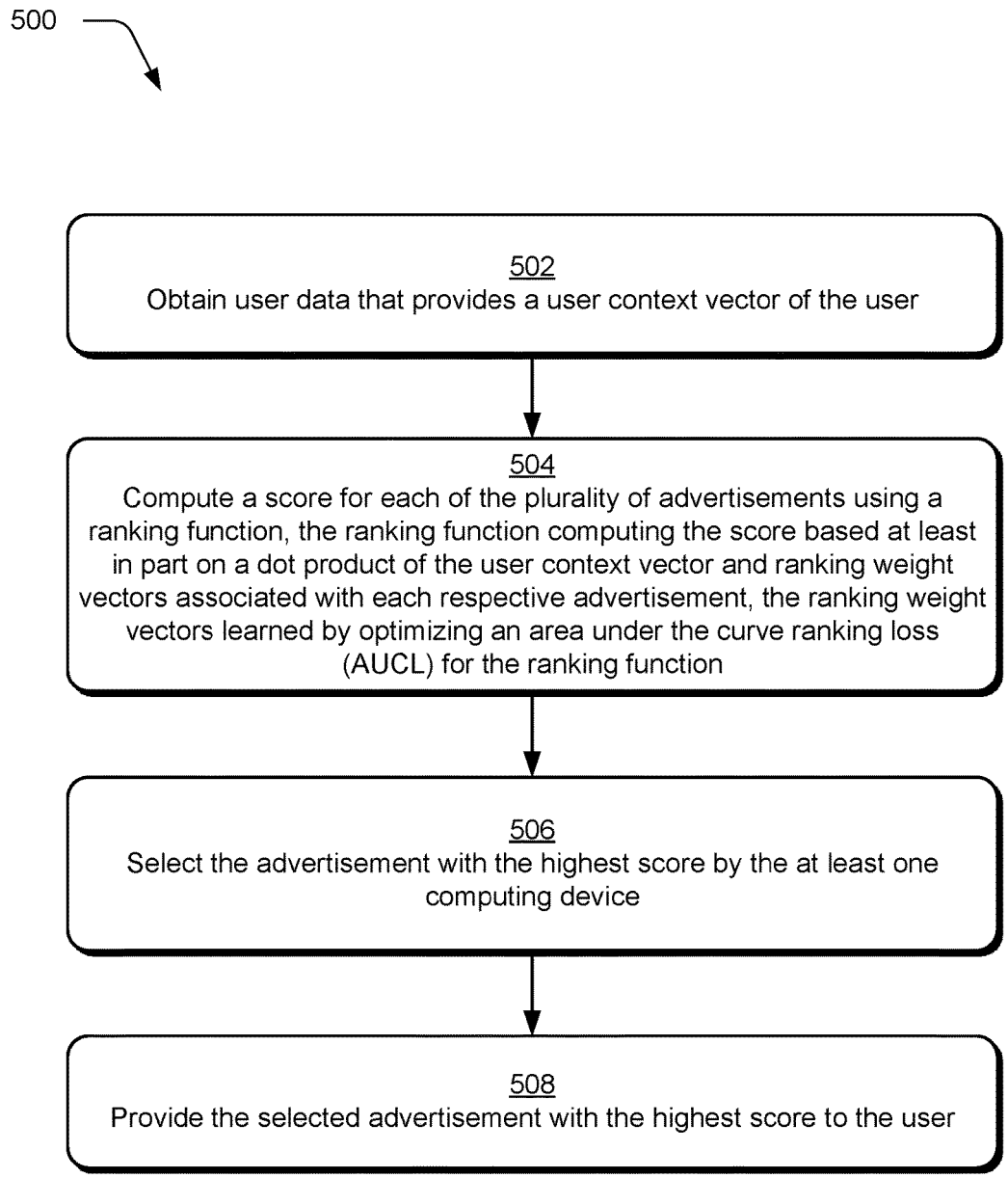
FIG. 5 illustrates a procedure in an example implementation of recommending an advertisement for a user using a ranking function.

FIG. 5 illustrates a procedure 500 in an example implementation of recommending an advertisement for a user using a ranking function. At 502, user data is obtained that provides a user context vector of a user. For example, ranking module 304 obtains user data that provides user context vector 302 of the user.

At 504, a score is computed for each of a plurality of advertisements using a ranking function that computes the score based at least in part on a dot product of the user context vector and ranking weight vectors associated with each respective advertisement. For example, ranking module 304 utilizes ranking function 122 to compute a score 306 based at least in part on a dot product of the user context vector 302 and the ranking weight vectors 218 associated with each respective advertisement 112. The ranking weight vectors 218 are learned by optimizing an area under the curve ranking loss (AUCL) for the ranking function 122.

At 506, the advertisement with the highest score is selected, and at 508 the selected advertisement with the highest score is provided to the user. For example, ranking module 304 selects recommended advertisement 308 and provides recommended advertisement 308 to client device 104 associated with the user.

Example System and Device

Figure 6:
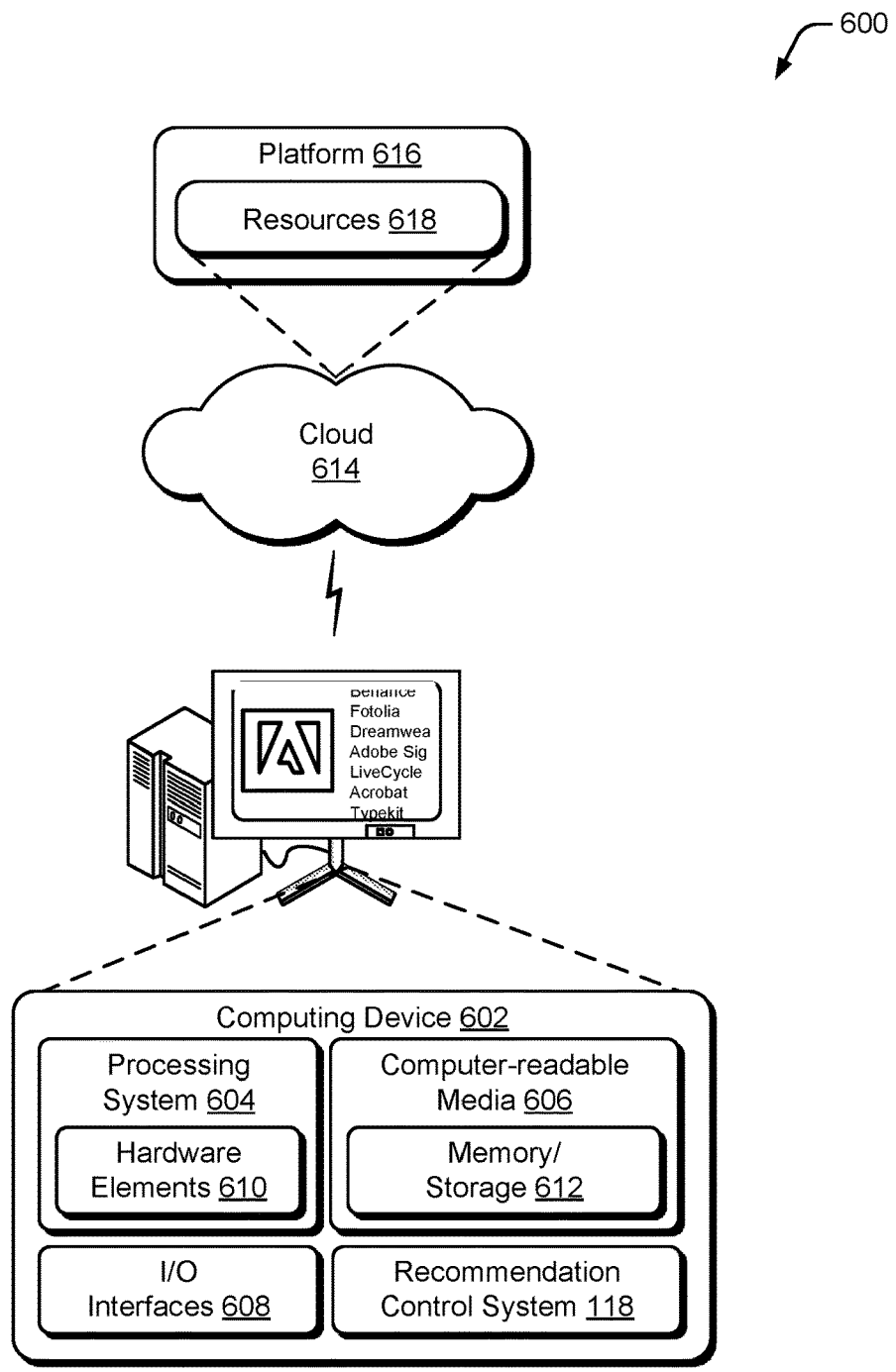
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the recommendation control system 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to recommend one of a plurality of digital content items for a user in order to increase a likelihood of user interaction with the recommended digital content item, a method implemented by at least one computing device comprising:

obtaining user data, by the at least one computing device, that provides a user context vector of the user responsive to navigation by a user device of the user to a web page;

for each of the plurality of digital content items, generating, by the at least one computing device, a score using a respective ranking function for a respective digital content item that computes a dot product of the user context vector and ranking weight vectors of the respective digital content item of the plurality of digital content items, the ranking weight vectors for each respective ranking function learned by a training module that obtains training data describing previous positive user interactions and negative user interactions with the plurality of digital content items and learns the ranking weight vectors by controlling scores of the positive user interactions to be higher than the negative user interactions by optimizing an area under the curve ranking loss (AUCL) function for each respective ranking function;

generating, by the at least one computing device, normalized scores by shifting the generated scores for the digital content items using a threshold score;

generating a ranked list of the digital content items by sorting the digital content items in descending order based on the normalized scores of the digital content items;

selecting, by the at least one computing device, a digital content item from the ranked list of the digital content items that is associated with a highest normalized score;

communicating, over a network, the selected digital content item with the highest normalized score to the user device of the user for display within the web page;

receiving user feedback indicating whether the user interacted with the selected digital content item; and updating the ranking weight vectors associated with the selected digital content item based on the user feedback.

2. The method as described in claim 1, wherein the user feedback corresponds to the user clicking on the selected digital content item.

3. The method as described in claim 1, wherein the user feedback corresponds to the user not clicking on the selected digital content item.

4. The method as described in claim 1, wherein the updating comprises updating the ranking weight vectors associated with the selected digital content item in real-time responsive to receiving the feedback.

5. The method as described in claim 1, wherein the updating comprises batching the user feedback with additional user feedback received from additional user interactions with additional digital content items, and updating the ranking weight vectors of the selected digital content item and the additional digital content items based on the batched user feedback.

6. The method as described in claim 1, wherein the AUCL function generates a ranking measure that is optimized when the ranking function scores all of the positive interactions higher than the negative interactions.

7. The method as described in claim 6, wherein the ranking function computes a score predicting the likelihood that a respective user will interact with the digital content item, the score based on the learned ranking weight vectors and a respective user context vector of the respective user.

8. The method as described in claim 6, wherein the training module learns the ranking weight vectors for the ranking function by randomly selecting a positive interaction and a negative interaction, and optimizing the ranking measure of the AUCL function by minimizing a difference between the score of the positive interaction and the negative interaction.

9. The method as described in claim 6, wherein the positive interactions correspond to the user clicking on the digital content item, and wherein the negative interactions correspond to the user not clicking on the digital content item.

10. A ranking control system implemented at least partially in hardware, the system comprising:

at least a memory and a processor to perform operations comprising:

obtaining user data that provides a user context vector of a user;

for each of a plurality of digital content items, generating a score using a respective ranking function for a respective digital content item that computes a dot product of the user context vector and ranking weight vectors of the respective digital content item of the plurality of digital content items, the ranking weight vectors for each respective ranking function learned by a training module that obtains training data describing previous positive user interactions and negative user interactions with the plurality of digital content items and learns the ranking weight vectors by controlling scores of the positive user interactions to be higher than the negative user interactions by optimizing an area under the curve ranking loss (AUCL) function for the ranking function;

generating normalized scores by shifting the generated scores for the digital content items using a threshold score;

selecting a digital content item that is associated with a highest normalized score;

communicating, over a network, the selected digital content item with the highest normalized score to a user device of the user for display;

receiving user feedback indicating whether the user interacted with the selected digital content item; and updating the ranking weight vectors associated with the selected digital content item based on the user feedback.

11. The system as described in claim 10, wherein the user feedback corresponds to the user clicking on the selected digital content item.

12. The system as described in claim 10, wherein the user feedback corresponds to the user not clicking on the selected digital content item.

13. The system as described in claim 10, wherein the updating comprises updating the ranking weight vectors associated with the selected digital content item in real-time responsive to receiving the feedback.

14. The system as described in claim 10, wherein the updating comprises batching the user feedback with additional user feedback received from additional user interactions with additional digital content items, and updating the ranking weight vectors of the selected digital content item and the additional digital content items based on the batched user feedback.

15. The system as described in claim 10, wherein the communicating, over the network, the selected digital content item with the highest normalized score to the user device of the user for display causes display of the selected digital content item in a web page navigated to by the user using a web browser implemented at the user device.

16. The system as described in claim 10, wherein the AUCL function generates a ranking measure that is optimized when the ranking function scores all of the positive interactions higher than the negative interactions.

17. The system as described in claim 16, wherein the ranking function computes a score predicting a likelihood that a respective user will interact with the digital content item, the score based on the learned ranking weight vectors and the user context vector of the respective user.

18. The system as described in claim 16, wherein the training module learns the ranking weight vectors for the ranking function by randomly selecting a positive interaction and a negative interaction, and optimizing the ranking measure of the AUCL function by minimizing the difference between the score of the positive interaction and the negative interaction.

19. The system as described in claim 16, wherein the positive interactions correspond to the user clicking on the digital content item, and wherein the negative interactions correspond to the user not clicking on the digital content item.

20. The system as described in claim 10, wherein the operations further comprise generated a ranked list of the digital content items by sorting the digital content items in descending order based on the normalized scores of the digital content items, and wherein the selecting further comprises selecting the digital content item from the ranked list of the digital content items that is associated with a highest normalized score.

* * * * *